Oct. 11, 1960
M. ZAJAC
2,955,347
PALLET CLAMP CONSTRUCTION
Filed July 9, 1956
2 Sheets-Sheet 1
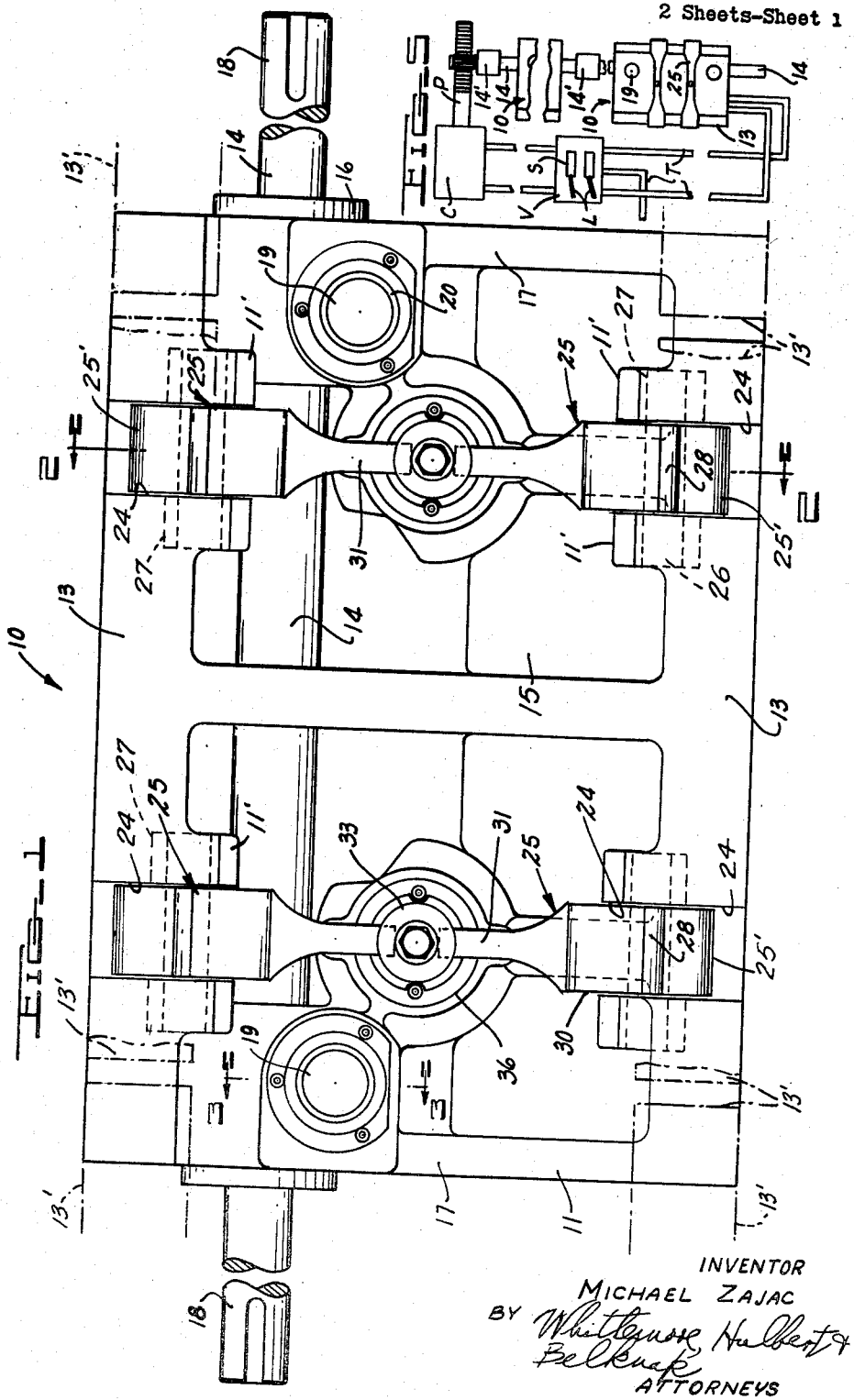
INVENTOR
MICHAEL ZAJAC
BY
ATTORNEYS Oct. 11, 1960
M. ZAJAC
2,955,347
PALLET CLAMP CONSTRUCTION
Filed July 9, 1956
2 Sheets-Sheet 2
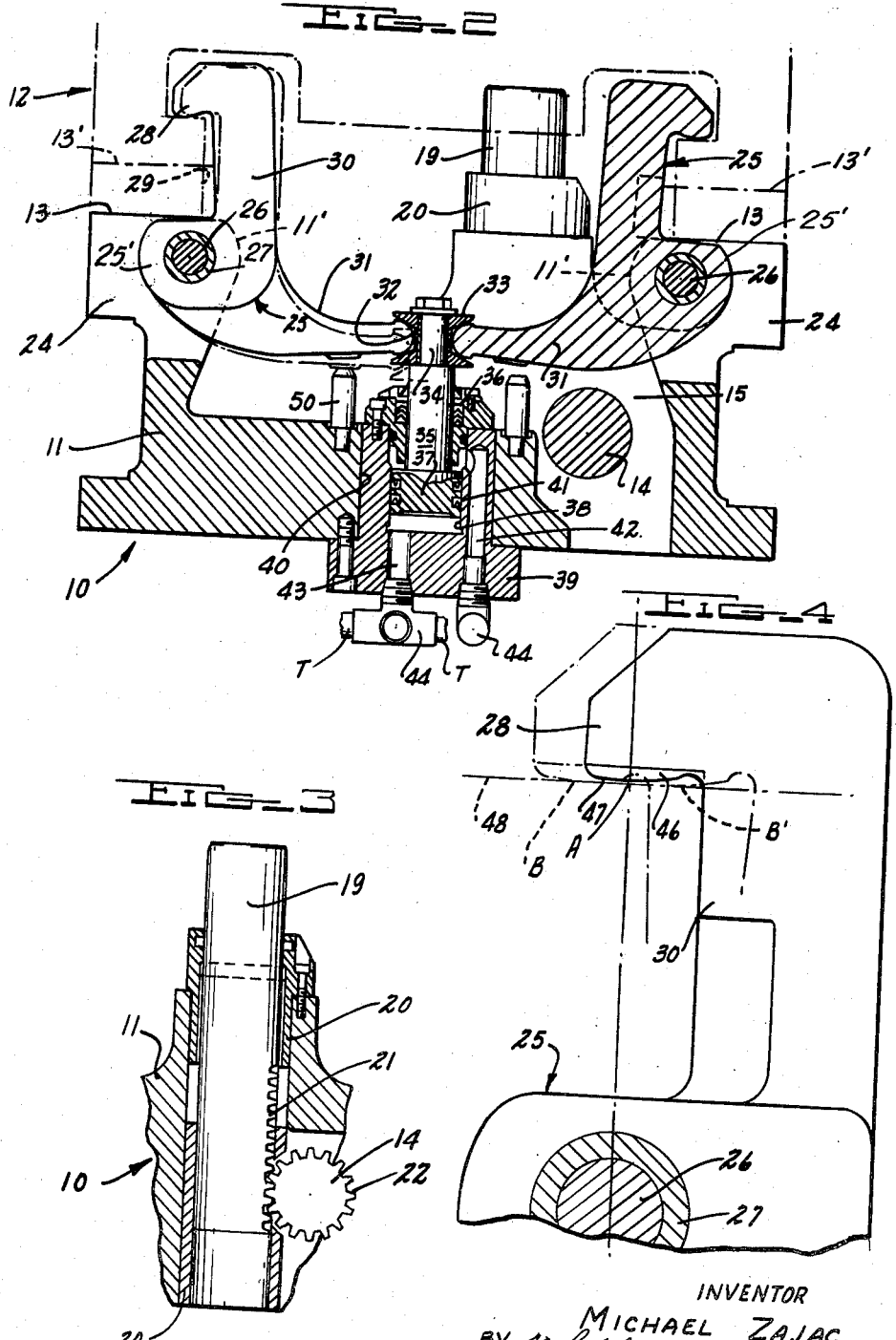
INVENTOR
MICHAEL ZAJAC
BY Whittemore, Hulbert &
Belknap
ATTORNEYS

# 2,955,347

PALLET CLAMP CONSTRUCTION

Michael Zajac, Detroit, Mich., assignor to Buhr Machine Tool Company, Ann Arbor, Mich., a corporation of Michigan Filed July 9, 1956, Ser. No. 596,539

4 Claims. (Cl. 29—1)

The present invention relates to an improved method of clamping pallets and the like units which hold a part for an operation performed by a machine tool, and to an improved pallet clamp. More particularly, the invention deals with a pallet clamp which is associated as a part of the automatic work transfer apparatus for a multiple station machine by which a series of successive machining operations are preformed on work periodically advanced by the transfer equipment.

It is an object of the invention to provide a pallet holding clamp for equipment of this sort which is controlled in the main by hydraulically operated means in the operations of the clamp in properly locating the pallet in relation to a machine tool, and then rigidly clamping the pallet for the machining operation. Thus the hydraulic lines servicing the clamp operating components may be interrelated in a very simple, expeditious and inexpensive manner with hydraulic conduitry and controls such as are commonly employed in the longitudinal advance of the pallets from tool to tool, as well as actuation of the tools in their operating cycle.

More specifically, it is an object to provide a pallet holding clamp which is itself of very simple and inexpensive construction, yet extremely rugged and effective in its pallet clamping and releasing action. A set of vertically acting locating pins or dowels is provided which is rack and pinion operated to engage and disengage the pallet, the mechanical means referred to being preferably operated at a relatively remote point under hydraulic power; and a pair of oppositely acting pallet engaging clamp jaws are directly actuated hydraulically at the pallet itself to clamp and unclamp the pallet. Accordingly, considerable mechanical jaw actuating mechanism likely to become damaged or improperly operative, if not inoperative, is eliminated, together with the added cost of production and assembly which it represents.

Another object is to provide a hydraulically controlled pallet clamp as described, in which all of the hydraulically powered pallet locating and clamping operations are automatically controlled in coordinately timed relation to the operation of the remainder of the transfer apparatus, as well as to operations of the machine tool or tools to which the clamped pallet presents a work piece.

A still further object is to provide a work pallet featuring pallet clamping jaws mounted for swinging movement adjacent opposite sides of a clamp base to engage and release a pallet on the latter, wherein the jaws have an extremely limited swing into and out of pallet releasing piston, being provided with rounded wedge faces to engage an adjacent, upwardly exposed pallet surface. By this arrangement a relatively slight hydraulic pressure at the jaw operating structure of the clamp is effective to produce a wedging engagement of the respective surfaces which holds the pallet to the clamp with great force, yet which is readily broken upon the reversal of the application of pressure which produced the wedging engagement.

In accordance with a still more specific object, the invention affords a clamp jaw structure as described, in which wedging engagement may be effected in either direction of swing of the pallet clamping jaw from a neutral, pallet releasing position.

A further object is to provide an improvement in machine tool transfer apparatus incorporating hydraulically operated pallet clamp provisions of the character above described.

The foregoing as well as other objects will be made more apparent as this description proceeds, especially when considered in connection with the accompanying drawings, wherein:

Fig. 1 is a plan view generally illustrating the type and arrangement of parts embodied in the improved pallet clamp, the nature of certain supplemental wear bars which may be employed in conjunction with the clamp being indicated in dot-dash line;

Figs. 2 and 3 are, respectively, views in vertical section along lines 2—2 and 3—3 of Figure 1, showing the control structure for the jaws and locating pins or dowels of the clamp, pallet and wear bar components being shown in dot-dash line in Fig. 2;

Fig. 4 is a fragmentary view in enlarged scale, illustrating an improved jaw structure, per se, which affords the desirable wedge clamping action referred to above; and Fig. 5 is a schematic layout, partially broken away, showing pallet clamps according to the invention as related to a known type of hydraulic powered transfer apparatus.

As viewed in Figs. 1 and 2 of the drawings, the clamp 10 of the invention comprises a rugged and relatively massive base 11 which is adapted to be clamped (by provisions not shown) adjacent and in proper register with a machine tool which is to perform an operation on a work piece or part supported on a suitable pallet 12 (shown in dot-dash line in Fig. 2); and the clamp 10 is provided with a pair of smooth, elongated pallet support and way surfaces 13 in laterally spaced relation to one another along its opposite upper sides.

When the invention is applied, as contemplated, to transfer apparatus serving a multi-station, in-line machine tool layout, by which successive machining operations or facing, drilling, reaming, tapping, and the like, are performed, it is to be understood that clamps 10 will be provided for each station, with the respective surfaces 13 coplanar and in longitudinal alignment. They thereby serve as portions of a way or guide along which the pallets 12 are progressively advanced by conventional mechanism. Appropriate bridging wear bars 13' indicated in dot-dash line in Figs. 1 and 2, may be positioned and secured over the ways 13 of successive clamps 10, along which wear bars the pallets 12 are slidably advanced. Likewise, each clamp has provision, to be hereinafter described, for mechanically coupling certain of its operating components, for example its pallet locating pins or dowels, with those of a preceding and/or succeeding clamp in the line.

To this end, a pinion shaft 14 is provided for each clamp, extending longitudinally thereof through the hollow interior 15 of the clamp, being journaled by appropriate bearing structure 16 (Fig. 1) in the opposite end walls 17 of the clamp. The projecting ends of the shaft 14 have appropriate key or like provisions 18 by which the shaft may be mechanically connected, as by a suitable releasable coupling 14', with the shaft of an adjacent clamp.

Pallet locating pins 19 of a conventional sort are mounted adjacent the opposite ends of the clamp for vertical sliding movement in appropriate bushing structure 20, having engagement with the pallet 12 in the usual fashion, as shown in Fig. 2.

Referring to Fig. 3, each of the dowels 19 is provided, internally of the clamp body 11, with rack teeth 21 in mesh with the teeth of a pinion formation 22 on the shaft 14. These latter teeth extend through an aperture in the bushing 20 for their mesh with the teeth 21; and upon rotation of the pinion portion 22 in opposite directions the pin 19 will be vertically projected and retracted in a well known manner.

A plurality of the clamps 10, as operatively connected at their shaft ends, may have their respective locating pins 19 simultaneously operated from a remote source of power. The invention contemplates that this source shall be a hydraulic cylinder and piston unit, such as is designated C in Fig. 5 and operates a plunger P which has rack teeth engaging a pinion formation on a shaft coupled to a clamp shaft 14. Further, it is contemplated that the hydraulic control of such a cylinder and plunger unit shall be governed by a solenoid or like electrically operated device which, in common with the control of the hydraulic operating mechanism of each individual clamp 10, may be coordinated in its action in timed relation with the operation of the mechanism which advances the pallets 12 longitudinally along the aligned clamp surfaces 13, the mechanism which advances the machine tools to and from their operating cycle, and the like.

The clamp base 11 is provided with longitudinally spaced recesses 24 sub-adjoining an opening through the support and way surfaces 13, in which the like, oppositely acting clamp jaws 25 of the improved clamp are pivoted, as by fixed pins 26 and associated bushings 27, at a point on the clamp base 11 which is on a theoretical vertical line at 90° to a horizontal surface of the pallet against which jaw 25 is to engage and clamp, as appears in Figs. 2 and 4. As shown in Fig. 1, there are two pairs of these oppositely acting clamp jaws, equidistantly spaced from the ends of the clamp base. The pivot pins 26 extend through intermediate boss portions 25' of jaws 25 which are received between integral ears or bosses 11' of the pallet base 11, in which ears the pins 26 and bushings 27 are received.

Each jaw 25 has an outwardly projecting clamp nose 28, which is downwardly engageable with the top surface of an inwardly flanged ledge portion 29 of the pallet 12, connected by a jaw body portion 30 with the pivot portion of the jaw. Each jaw 25 is also provided with an integral, inwardly extending and mildly rounded actuating tail 31 which terminates in a generally hemispherical actuating or control nose 32.

In addition to the general clamp assembly including the locating pins 19, the clamp jaws 25, and the respective hydraulically powered operating means therefor, the invention also deals with specific structural features of the clamp jaws 25, per se, and with the arrangements for pivoting the same through a limited arc, as will hereinafter be described.

The hemispherical tail actuating extremities 32 of the clamps 25 of each pair are received in the annular recess of a control spool 33 which is mounted on the reduced diameter extremity 34 of a vertically acting plunger stem 35. There is preferably a slight degree of lost axial motion at this control connection. The stem 35 is appropriately packed with stuffing held by a gland, as generally indicated at 36, and an enlarged lower piston head 37 of the plunger stem 35 is slidably received in the bore 38 of a cylinder insert or head 39 applied in a recess 40 in the clamp base 11.

The piston 37 is provided with appropriate rings or packing 41 to seal against leakage in either direction in the cylinder bore 38; and the head 39 has hydraulic passages 42, 43 therein which open to the cylinder bore 38 above and below the piston 37, respectively. Suitable T-fittings 44 connect these passages with hydraulic conduitry, piping or tubing T, controlled by suitable valve means V (Fig. 5) to effect a reversal of flow in the passages in timed relation to the operation of the remainder of the apparatus.

In accordance with the invention, the reversing of hydraulic liquid flow in the passages 42, 43 will be controlled by a valve which is operated by valve unit V (Fig. 5) under the control of limit switch means (not shown), such limit switch being actuated in timed relation to the operation of the locating pins 19. This is accomplished by associating the limit switch referred to with the rack and pinion arrangement described above for rotating the pinion shaft 14 in opposite directions.

Reference has been made to the fact that the pallet clamping jaws 25 clampingly engage and release the pallet ledge or flange 29 upon a very limited arcuate motion. As shown in Fig. 4 of the drawings, the clamping nose 28 of each jaw 25 is provided with a hardened lower portion 46 which is mildly rounded at 47 to afford a wedge surface. The jaw is shown in solid line in its releasing position, in which there is a clearance of 0.005 inch–0.007 inch between the lowermost portion of the jaw clamp surface 47 and the surface 48 of the pallet which is to be engaged thereby, shown in dot-dash line. In this position of the parts the lowermost point in question is designated in Fig. 4 by the reference character A, the pivot point of the jaw at 26 being on a theoretical vertical line normal to pallet surface 48 at the jaw-released zone A.

Upon elevation of the piston 37 (Fig. 2) under hydraulic pressure, the clamps 25 are swung through a limited arc, from the position shown in dot-dash line in Fig. 2 (solid line in Fig. 4) to that shown in solid line (dot-dash in Fig. 4). This engages the jaw surface 47 with the pallet at the point designated B in Fig. 4, the jaw being indicated in dot-dash line.

A wedging engagement takes place between the jaw and pallet surfaces 47, 48 which, under relatively limited hydraulic pressure in the cylinder 38, produces a very strong clamping action to restrain the pallet. The effort required to accidentally dislodge the pallet from the clamping action of the jaw is practically the effort which would be required to spread the clamp nose 28 vertically from its pivot 26 along a direct theoretical line through the pivot and jaw surface 47 at zone B; and the cross sectional area of the jaw in any portion between these parts is amply large to withstand any such stress. Yet the jaw 25 is released by clockwise rotation to its solid line position in Fig. 4 under a relatively small hydraulic force applied to passage 42 (Fig. 2) and the upper side of piston 37 which, it is seen, is of substantially less area than its lower exposed surface. This is because of the fact that the jaw pivot at 26 is directly under the clamping point, enabling the jaw surface 47 to swing out almost parallel with pallet surface 48 to the release point A.

It is contemplated by the invention that the jaws 25 may be optionally operated in opposite rotative directions to effect their clamping engagement with the pallet. Thus, as shown in Fig. 4, the jaw 25 may be rotated clockwise, as by application of hydraulic pressure to the upper portion of cylinder bore 38 (to engage its jaw surface 47 with a pallet in the position designated B' in Fig. 4). The movement in this direction is also through a relatively limited arc, and the wedging engagement of jaw and pallet is just as effective as it is when the clamping movement is in the opposite direction. If necessary, the width of the clamping surface 48 of pallet 12 may be increased to obtain the desired engagement at B', which may dictate the need to relieve the clamp body 30 somewhat adjacent its clamping jaw surface 47. However, this is merely a matter of design.

Referring to Fig. 2 of the drawings, the clamp base 11 is preferably provided with pairs of upstanding stop pins 50 engaged by the clamp jaw tails 31 to limit their movement in the releasing direction. Naturally, if clamping engagement were made at the point B' (Fig. 4) the stop arrangement would be reversed.

In the operation of the improved clamp as a part of the transfer mechanism, and assuming that the clamp jaws 30 are in their release position affording a slight clearance between their clamp surfaces 47 and the pallet flange surfaces 48, upon advance of a pallet 12, by the usual mechanism employed for this purpose, a limit switch is actuated to appropriately energize a solenoid and thus rotate the pinion shaft 14 in clockwise direction, as viewed in Figs. 2 and 3. This causes the shaft to elevate the locating pins or dowels 19 through the rack and pinion provisions shown in Fig. 3 and engage the pins 19 with the pallet, as shown in Fig. 2. Upon completion of the elevation of the locating pins, another limit switch is actuated, which switch energizes another solenoid, designated S in Fig. 5, controlling the valve unit V which reverses flow in the tubing T leading to passages 42, 43. Hydraulic pressure is applied through passage 43 through the lower end of cylinder bore 38, elevating piston 37 and plunger stem 35. This causes the spool 33 to swing the clamp jaws 25 oppositely about their pivots at 26, engaging the jaw clamp noses 28 with the pallet flange surface 48, in the position B of Fig. 4. Leads L connect solenoids S to the limit switches.

The machine tool is then advanced and performs its function, and upon completion of the machine operation and withdrawal of this tool limit switch means cause a reversal of hydraulic flow, applying pressure to the upper side of piston 37 to release the clamp jaws 25. This in turn occasions a reverse rotation of the pinion shaft 14, through the shaft operating mechanism referred to above, to withdraw the locating pins 19 from the pallet 12. The pallet is then advanced, and a succeeding pallet is brought into position on the clamp 10, whereupon the above described cycle is repeated.

The clamp of the invention is a very compact, rugged and inexpensive one, involving an absolute minimum of mechanical parts likely to become inoperative. Its operation is tied in with the operation of the usual hydraulic system of the transfer equipment of which it is a part, rather than requiring an independent mechanical actuating arrangement. It is seen by reference to Fig. 2 that the conduit provisions controlling the operation are extremely simple and inexpensively installed. Th hydraulic pressure required to operate the piston 37 is a nominal one.

It is seen from the foregoing that the invention affords pallet clamp structure having dual advantages, in general. First, a clamp is provided which is integrated in respect to its operation with the operating means for the machine tool it serves, i.e., hydraulically. Second, the clamp incorporates improved clamp jaw features, whether operated hydraulically or otherwise, by which an extremely strong gripping action is had by the application of very little actuating force. The grip is released by the application of a force which is nominal.

What I claim as my invention is:

1. A clamp for holding a pallet or like unit presenting a clamping surface, comprising a supporting base and a jaw having means pivotally mounting the same on said base for swinging movement into and out of clamping engagement with said surface in a very mild arc approximately paralleling said clamping surface, said jaw having a body portion extending from the pivot thereof and a clamping nose offset and projecting laterally from said body portion and provided with a clamping surface engageable with said clamping surface of said unit, said nose clamping surface being mildly curved convexly in the direction toward said clamping surface of said unit, said jaw being mounted by said means on said base on a theoretical line through the jaw pivot offset laterally from said jaw body portion in the direction of offset of said nose therefrom and being substantially normal to said clamping surface of said unit and nose in a position of disengagement of the nose surface from said clamping surface of the unit, said clamping nose being positioned from said pivot a distance along said theoretical line such that said curved clamping surface thereof follows said arc, in moving into and out of clamping engagement, at a maximum distance in the order of a few thousandths of inches from the clamping surface of said unit.

2. A clamp for holding a pallet or like unit presenting a clamping surface, comprising a supporting base and a jaw having means pivotally mounting the same on said base for swinging movement in an arc almost paralleling said clamping surface into and out of clamping engagement with the latter, said jaw including a body portion extending from the pivot thereof, and a clamping nose offset and projecting laterally from said body portion and provided with a clamping surface engageable with said clamping surface of said unit, said clamping surface of said nose being mildly curved convexly in the direction toward said clamping surface of said unit, and being spaced from said clamping surface of the unit a maximum distance in the order of 0.005 inch–0.007 inch when said nose is in a disengaged position and adjacent said clamping surface of the unit, a theoretical line through the jaw pivot being offset laterally from said jaw body portion in the direction of offset of said nose therefrom being substantially normal to said clamping surfaces of said unit and nose when said nose is so disengaged, the mild curvature of said nose clamping surface enabling a wedging and strong clamping engagement of said nose with said clamping surface of the unit under the application of relatively small actuating force to said jaw.

3. A clamp for holding a pallet or like unit presenting a clamping surface, comprising a supporting base and a jaw having means pivotally mounting the same on said base for swinging movement in an arc almost paralleling said clamping surface into and out of clamping engagement with the latter, said jaw including a body portion extending from the pivot thereof, and a clamping nose offset and projecting laterally from said body portion and provided with a clamping surface engageable with said clamping surface of said unit, said clamping surface of said nose being mildly curved convexly in the direction toward said clamping surface of said unit, and being spaced from said clamping surface of the unit a maximum distance in the order of 0.005 inch–0.007 inch when said nose is in a disengaged position in a medial portion of the swing of said jaw in either direction along said limited arc, thereby adapting said nose for rapid clamping engagement with the clamping surface of such a unit upon swinging of said jaw in either direction, a theoretical line through the jaw pivot being offset laterally from said jaw body portion in the direction of offset of said nose therefrom being substantially normal to said clamping surfaces of said unit and nose when said nose is so disengaged, the mild curvature of said nose clamping surface enabling a wedging and strong clamping engagement of said nose with said clamping surface of the unit under the application of relatively small actuating force to said jaw.

4. A clamp for holding a pallet or like unit presenting a clamping surface, comprising a supporting base and a jaw having means pivotally mounting the same on said base for swinging movement in a limited arc almost paralleling said clamping surface into and out of clamping engagement with the latter, said jaw including a body portion extending from the pivot thereof, a clamping nose offset and projecting laterally from said body portion, an actuating tail projecting from said body portion oppositely of said nose, and a medial pivot portion between said nose and tail about which said jaw swings upon actuation of said tail, said clamping nose being provided with a clamping surface engageable with said clamping surface of said unit, said clamping surface of said nose being mildly curved convexly in the direction toward said clamping surface of said unit, and being spaced from said clamping surface of the unit a maximum distance in the order of 0.005 inch–0.007 inch when said nose is in a disengaged position and adjacent said clamping surface of said unit, thereby adopting said nose for rapid clamping engagement with the clamping surface of such a unit upon swinging of said jaw, a line through the jaw pivot being offset laterally from said jaw body portion in the direction of offset of said nose therefrom being substantially normal to said clamping surfaces of said unit and nose when said nose is so disengaged, the mild curvature of said nose clamping surface enabling a wedging and strong clamping engagement of said nose with said clamping surface of the unit under the application of relatively small actuating force of said tail.

References Cited in the file of this patent

UNITED STATES PATENTS

| | | |
|---|---|---|
| 917,098 | Moffat | Apr. 6, 1909 |
| 1,022,761 | Stvanek | Apr. 9, 1912 |
| 1,405,622 | Blood | Feb. 7, 1922 |
| 1,612,317 | Reed | Dec. 28, 1926 |
| 1,947,957 | Tillman | Feb. 20, 1934 |
| 1,974,660 | Sinclair | Sept. 25, 1934 |
| 2,340,653 | Fiegel | Feb. 1, 1944 |
| 2,486,075 | Strom | Oct. 25, 1949 |
| 2,559,369 | Phillips | July 3, 1951 |
| 2,638,659 | Walter | May 19, 1953 |
| 2,642,179 | Cross | June 16, 1953 |
| 2,665,905 | Lyon | Jan. 12, 1954 |